United States Patent [19]

Rauch et al.

[11] 3,929,917

[45] Dec. 30, 1975

[54] PROCESS FOR THE MONONITRATION OF ORTHO-XYLENE

[75] Inventors: Francis Clyde Rauch, Warrington, Pa.; Anthony Joseph Fanelli, Rockaway, N.J.; Gerlinde Metzler Blank, Wilton, Conn.

[73] Assignee: American Cyanamid Company, Stamford, Conn.

[22] Filed: June 11, 1974

[21] Appl. No.: 478,190

[52] U.S. Cl. ................................................ 260/645
[51] Int. Cl.² .......................................... C07C 79/10
[58] Field of Search ..................................... 260/645

[56] References Cited
OTHER PUBLICATIONS

Astle, Industrial Organic Nitrogen Compounds, Reinhold Pub. Corp., New York, 1961, pp. 314, 315 and 319.

*Primary Examiner*—Leland A. Sebastian
*Attorney, Agent, or Firm*—Harry H. Kline

[57] ABSTRACT

There is provided a process for mononitrating ortho-xylene by reacting o-xylene with nitrogen tetroxide ($N_2O_4$) or nitrogen dioxide ($NO_2$) and an oxygen containing gas, such as oxygen, in the presence of a mercuric salt dissolved in acetic acid to obtain good yields of mononitrated o-xylene having an isomer distribution of at least a 70:30 ratio of 4- to 3- nitro-o-xylenes. Such 4-nitro-o-xylene, upon separation from the isomeric mixture, finds utility in the preparation of xylidine derived preemergence herbicides.

7 Claims, No Drawings

PROCESS FOR THE MONONITRATION OF ORTHO-XYLENE

The present invention relates to the selective nitration of o-xylene. More particularly, it relates to the mononitration of o-xylene utilizing a mixture of nitrogen tetroxide ($N_2O_4$) or nitrogen dioxide ($NO_2$) and an oxygen containing gas, such as oxygen, in the presence of a mercury salt to obtain mononitrated o-xylenes in good yields having at least a 70:30 ratio of 4- to 3- nitro-o-xylenes. Still more particularly, the invention is concerned with the nitration of o-xylene utilizing a mixture of $N_2O_4$ or $NO_2$ and an oxygen-containing gas both in the presence of a mercury salt and an inert aliphatic monocarboxylic acid solvent to obtain mononitrated o-xylenes in good yields having at least a 70:30 ratio of 4- to 3- nitro isomer distribution.

It is known that good yields of nitrated o-xylenes are obtained by utilizing a mixture of nitric acid and sulfuric acid as the nitrating agent. However, such mixed acid results in a relatively low ratio of 4- to 3- nitro-o-xylenes, namely, from about 45% 4- nitro-xylene to about 55% 3- nitro-o-xylene, respectively. Unfortunately, for certain noted applications the 3-nitro isomer cannot be utilized. In an attempt to improve the isomer distribution, a mercury catalyst has been incorporated into the aforementioned mixed acid nitrating medium. Here again, serious problems are encountered in that low conversions are attained employing only nitric acid and precipitation of mercuric sulfate occurs with loss of mixed acid activity in conventional mixed acid media. If a process could be developed to decrease the 3-isomer yield while increasing the 4-isomer overall yield whereby difficulties such as mercuric sulfate precipitation are avoided, such a process would fulfill a long felt need in the art.

It is, therefore, a principal object of the invention to provide a process for improving the overall yield of monitro-o-xylene whild increasing the 4- to 3- nitro-o-xylene isomer ratio to at least 70:30, respectively. It is a further object of the invention to employ a nitrating agent in the presence of a mercury catalyst without experiencing precipitation of mercuric sulfate, whereby the effectiveness of the nitrating agent remains unaltered. Other objects and advantages will be readily ascertained from a reading of the ensuing description.

To these ends, it has been unexpectedly found that mononitration of o-xylene occurs when o-xylene is subjected to a nitrogen tetroxide or nitrogen dioxide and air or oxygen mixture in the presence of a mercury catalyst under critical reaction conditions hereinbelow set forth. The desired 4- to 3- nitro-o-xylene isomer, absent any dinitro o-xylene derivative, is surprisingly obtained in good yield.

According to the process of the invention, an improved 4- nitro-o-xylene to 3- nitro-o-xylene ratio is attained by subjecting o-xylene preferably in a solvent, such as acetic or propionic acid, and containing a mercury salt, such as mercuric acetate or mercuric propionate, to the action of $N_2O_4$ or $NO_2$ and an oxygen-containing gas at temperatures above about 20°C., and usually between about 25°C. and 80°C. It is a good practice to react about 1 mol of o-xylene with a mixture of about 0.5 mol of $N_2O_4$ or 1 mol of $N_2O_4$ and from about 0.25 mol to 1 mol of oxygen or at least 1 mol of air in the presence of from 0.01 mol to 0.08 mol of a mercury salt, such as mercuric acetate, mercuric propionate or mercuric benzoate, at a temperature ranging from about 55°C. to 65°C. to attain optimum yields of desired isomer distribution. The time of reaction can vary from about 1 hour to about 8 hours. Advantageously, an inert lower aliphatic monocarboxylic acid solvent, such as acetic acid, propionic acid, n-butyric acid, pentanoic acid, and the like, can be employed. The latter can be present in an amount ranging from about 1.0 mol to 10 mols of the acid per mol of o-xylene employed as the reactant.

The overall process can be structurally written, for instance, as follows:

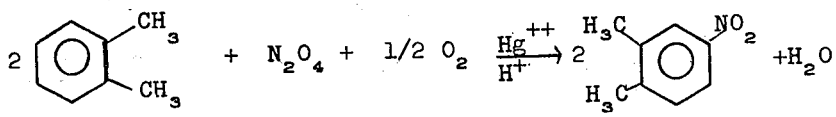

whereby a 4- nitro to 3- ratio of nitro-xylene ratio is increased from about 45:55, respectively, to about 70:30, and higher, respectively, and an overall yield of from 70% to 95%, or higher.

In a preferred embodiment, o-xylene and acetic acid containing mercuric acetate are maintained in a suitable reactor at about 60°C. while gaseous nitrogen tetroxide is introduced in a stream of oxygen. The reaction is terminated when approximately 80% of the o-xylene has been converted principally to a 75:25 isomer mixture of 4- and 3- nitro-o-xylene determined by vapor phase chromatography. During reaction, no dinitro products are formed. Resultant mixture is then distilled to remove acetic acid and unreacted o-xylene. These are recycled to the reactor to which additional tetroxide and o-xylene are introduce. The mercury is separated from the organic phase after treating the crude nitro-o-xylene/mercury mixture with chlorine gas in the presence of aqueous hydrochloric acid. The so separated aqueous phase is next treated with iron to form a mercury/iron amalgam which is recycled to the reactor. The organic phase which contains the crude nitro-o-xylene is subjected to fractional distillation to separate the 4-nitro-o-xylene from the 3-nitro isomer to obtain at least a 70% - 75% yield of 4-nitro-o-xylene, based on converted o-xylene.

Advantageously, minimal by-products are obtained during reaction, particularly when terminating the reaction after 80% of the o-xylene has been converted. Further, no dinitro-o-xylene derivatives are formed. These occur in the mixed acid nitrating process of the prior practice.

The invention will be illustrated in conjunction with the following examples which are to be taken as illustrative only and not by way of limitation. All parts are by weight, unless otherwise noted.

EXAMPLE 1

To a suitable reaction vessel equipped with thermometer and gas inlet are introduced 0.05 mol of mercuric acetate dissolved in 5 mols of glacial acid. The mixture is heated to 60°C. There is next added 1 mol of o-xylene while introducing 1 mol of nitrogen tetroxide and 1 mol of oxygen into the reaction mixture. The progress of the reaction is followed by periodically withdrawing samples and analyzing for xylene and nitro-xylenes by vapor phase chromatography. The total time for reaction is six hours. After 80% completion of the reaction as indicated by vapor phase chromatography, the reaction is terminated by pouring the mixture into water which results in the separation of an aqueous phase from an organic phase. The latter phase is extracted with chloroform and washed with water. The chloroform is next evaporated and the residue is weighed, redissolved in chloroform and analyzed by vapor phase chromatography. There is obtained a nitro-o-xylene, free of dinitro-o-xylenes analyzing as 82 parts of 4-nitro-o-xylene and 18 parts of 3-nitro-o-xylene. Total yield of 4-nitro-o-xylene amounts to 75%, based on the weight of o-xylene.

EXAMPLE 2

This example illustrates the use of a mixed acid nitrating agent.

The procedure of Example 1 is followed in every respect except that a mixture of 0.5 mol of concentrated nitric acid and 0.5 mol of concentrated sulfuric acid is substituted for the nitrogen tetroxide-oxygen mixture as the nitrating mixture. There is obtained an isomer ratio of 45:55 of 4-nitro-o-xylene to 3-nitro-o-xylene, respectively.

EXAMPLE 3

The procedure of Example 1 is repeated in every detail except that the overall time is reduced from six hours to four hours. There is obtained an isomer ratio of 73:27 of 4-nitro-o-xylene to 3-nitro-o-xylene, respectively.

EXAMPLE 4

The procedure of Example 1 is repeated in every detail except that a reaction temperature of 35°C. and a nitrating mixture of 2.0 mols of nitrogen dioxide and 5 mols of air are employed. Upon analysis, a ratio of 76:24 of 4-nitro-o-xylene and 3-nitro-o-xylene, respectively is noted with an overall yield of 80% 4-nitro-o-xylene, based on the weight of the o-xylene reactant. No dinitro-xylenes are detected.

Advantageously, the process of the invention utilizing as the novel nitrating agent, namely, either nitrogen tetroxide or nitrogen dioxide and oxygen or an oxygen containing gas such as air, permits the formation of desirable ratios of 4-nitro-o-xylene to 3-nitro-o-xylene whereby the 4-nitro-isomer is recovered in good yields. Concomitantly, no dinitro-o-xylenes are obtained as in the prior practice.

We claim:

1. A process for mononitrating o-xylene which consists essentially in the steps of: reacting stoichiometrically o-xylene with a mixture of nitrogen dioxide or nitrogen tetroxide and an oxygen-containing gas in the presence of a mercury salt, at a temperature of from about 25°C. to about 80°C. for from about 1.5 hours to about 8.0 hours, and recovering mononitro-o-xylene in good yield and having an isomer distribution ratio of at least 70:30 of 4-nitro-o-xylene to 3-nitro-o-xylene, respectively.

2. The process according to claim 1 wherein 1 mol of o-xylene, 1 mol of nitrogen dioxide, from at least about 0.25 mol of oxygen and from 0.01 mol to 0.08 mol of a mercury salt are reacted.

3. The process according to claim 1 wherein 1 mol of o-xylene, 0.5 mol of nitrogen tetroxide, from at least about 0.25 mol of oxygen and from 0.01 mol to 0.08 mol of a mercury salt are reacted.

4. The process according to claim 3 wherein 0.05 mol of mercuric acetate as the mercury salt and from about 1 mol to 10 mols of acetic acid are reacted.

5. The process according to claim 3 wherein the mercuric salt is mercuric propionate.

6. The process according to claim 4 wherein 5 mols of acetic acid are employed to obtain an isomer distribution ratio of 82;18 of 4-nitro-o-xylene and 3-nitro-o-xylene, respectively.

7. The process according to claim 3 wherein the nitration reaction is terminated when 80% of the o-xylene reaction is converted to mononitro-o-xylene.

* * * * *